US008752600B2

(12) United States Patent
Mita

(10) Patent No.: US 8,752,600 B2
(45) Date of Patent: Jun. 17, 2014

(54) PNEUMATIC TIRE WITH TREAD HAVING LAND PORTIONS DEFINING DROP LENGTHS

(75) Inventor: Masaya Mita, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 772 days.

(21) Appl. No.: 12/876,495

(22) Filed: Sep. 7, 2010

(65) Prior Publication Data

US 2011/0061780 A1    Mar. 17, 2011

(30) Foreign Application Priority Data

Sep. 11, 2009  (JP) ................................. 2009-210774

(51) Int. Cl.
  *B60C 11/03*  (2006.01)
(52) U.S. Cl.
  USPC ................. 152/209.8; 152/209.9; 152/209.15
(58) Field of Classification Search
  USPC ............................... 152/209.8, 209.9, 209.15
  See application file for complete search history.

(56) References Cited

U.S. PATENT DOCUMENTS

| | | | | |
|---|---|---|---|---|
| 4,722,378 A | * | 2/1988 | Carolla et al. | 152/209.15 |
| 5,358,021 A | * | 10/1994 | Takasugi et al. | 152/209.8 |
| 5,643,373 A | * | 7/1997 | Iwasaki | 152/209.15 |
| 6,119,745 A | * | 9/2000 | Sugihara | 152/209.9 |
| 7,478,657 B2 | | 1/2009 | Shida | |
| 2008/0257466 A1 | * | 10/2008 | Fujita | 152/209.8 |
| 2009/0266458 A1 | * | 10/2009 | Takahashi | 152/209.18 |

FOREIGN PATENT DOCUMENTS

| | | | |
|---|---|---|---|
| CN | 1668484 A | | 9/2005 |
| CN | 196047 A | | 1/2007 |
| DE | 102009003565 A1 | * | 9/2010 |
| JP | 03-204308 A | * | 9/1991 |
| JP | 10-029408 A | * | 2/1998 |
| JP | 2002-029216 A | * | 1/2002 |
| JP | 2009-006833 A | * | 1/2009 |

OTHER PUBLICATIONS

Machine translation for Japan 2009-006833 (no date).*
Machine translation for Japan 2002-029216 (no date).*
Machine translation for Japan 10-029408 (no date).*
Chinese Office Action for 201010276588.5—Feb. 25, 2014.

* cited by examiner

*Primary Examiner* — Steven D Maki
(74) *Attorney, Agent, or Firm* — Global IP Counselors, LLP

(57) ABSTRACT

The pneumatic tire includes a tread pattern having a land portion sandwiched between tire circumferential grooves. A groove area ratio of the tread pattern is different between areas on opposite sides with reference to a tire center line in a tire width direction. A first side has the larger groove area ratio and a second side has the smaller groove area ratio respectively. The land portion is protruding outward in a tire radial direction and the land portion has edge portions bordering the tire circumferential grooves and formed by groove walls of the tire circumferential grooves sandwiching the land portion and a surface of the land portion. A drop length of the edge portion facing to the first side from a most protruding point of the land portion along the tire radial direction is longer than a drop length of the edge portion facing to the second side.

6 Claims, 3 Drawing Sheets

PNEUMATIC TIRE WITH TREAD HAVING LAND PORTIONS DEFINING DROP LENGTHS

BACKGROUND OF THE INVENTION

1. Field of the Invention

The present invention relates to a pneumatic tire.

2. Description of the Related Art

Recently, in a tire market, e.g., the European market, there is a need for improvement of handling and stability including handling performance, high-speed lane changing performance, and the like of a pneumatic tire (hereafter referred to as "tire"), as performance of vehicles increases. For the improvement of the handling and stability, a tire having an asymmetric tread pattern and continuously extending land portions has been proposed. When the tire having the asymmetric tread pattern is mounted to the vehicle, the tire is disposed so that the tire tread pattern has a smaller groove area ratio on the outside portion of a tread area, the outside portion having a significant influence on the handling and stability, and a larger groove area ratio on the inside portion of the tread area. In this way, the tire having the asymmetric tread pattern can achieve the improvement of the handling and stability while maintaining performance during traveling on a wet road.

Moreover, in order to further enhance the handling performance of the tire, the continuously extending land portions between circumferential grooves of the tire are widened to thereby increase tread stiffness. However, if the continuously extending land portions are widened, the land portions are subject to uneven contact pressure, i.e., higher contact pressure in edge areas of each of the continuously extending land portions and lower contact pressure in inner areas. This results in unevenness of the contact pressure. As a result, high-speed lane change and handling are not necessarily performed smoothly and the high-speed lane changing performance and the handling performance may not be improved in some cases.

On the other hand, there is a known tire for improving cornering performance of a vehicle and stability for straight traveling at a high speed (Japanese Patent Application Laid-Open No. 2002-29216).

On this tire, a land portion is defined on a tread portion by grooves intersecting a cut section of the tread portion along a tread width, contact faces of the land portion are formed in curved shapes protruding radially outward along the tread width, and top portions of the contact faces which are the closest to an outline of a tread surface extending throughout the tread width are displaced toward one side edges of the land portion with respect to a center of a width of the land portion by distances 0.1 to 0.4 times the width of the land portion. In this way, the stability for straight traveling is expected to be improved advantageously while other performance such as drainage performance and a ride comfort including noise, vibration and harshness is maintained.

SUMMARY OF THE INVENTION

However, in the above-described tire, the handling performance is not necessarily improved in some cases.

Under such circumstances, it is an object of the present invention to improve handling and stability including handling performance in a pneumatic tire having an asymmetric tread pattern.

According to one aspect of the invention, there is provided a pneumatic tire including a tread pattern having a land portion sandwiched between tire circumferential grooves.

In the pneumatic tire, two areas on opposite lateral sides of the tread pattern with reference to a tire center line in a tire width direction are different from each other in a groove area ratio of the tread pattern. The land portion is in a shape protruding outward in a tire radial direction and the land portion has edge portions bordering the tire circumferential grooves and formed by groove walls of the tire circumferential grooves and a surface of the land portion.

When one area of the two areas which has a larger groove area ratio than the other area of the two area is located on a first side of the tread pattern and the other area having the smaller groove area ratio than the one area is located on a second side, a drop length between a position of a first edge portion of the land portion facing to the first side and a position of a most protruding point of the land portion along the tire radial direction is longer than a drop length between a position of a second edge portion of the land portion facing to the second side and position of the most protruding point of the land portion along the tire radial direction.

The drop length at the first edge portion is preferably 0.01 to 0.08 times the groove depths of the tire circumferential grooves.

When the land portion is divided into a center area including the most protruding point, a first area facing to the first side with reference to the center area, and a second area facing to the second side, each of land portion profile shapes of the first area and the second area is determined by a single circular arc. Radiuses of curvature of the single circular arc of the first area and the second area are preferably 0.05 to 0.15 times a radius of curvature of a tread profile shape.

The radius of curvature in the first area is preferably smaller than the radius of curvature in the second area.

The tread pattern includes three or more circumferential rib grooves and two or more continuously extending land portions sandwiched between the circumferential rib grooves, for example, each of the circumferential rib grooves is the tire circumferential groove and each of the continuously extending land portions is the land portion in the shape protruding outward in the tire radial direction.

According to the pneumatic tire of the invention, it is possible to improve the handling and stability including the handling performance in the pneumatic tire having the asymmetric tread pattern.

DETAILED DESCRIPTION OF PREFERRED EMBODIMENTS

A pneumatic tire according to the present invention will be described below based on an exemplary embodiment illustrated in the accompanying drawings.

Figure 1:
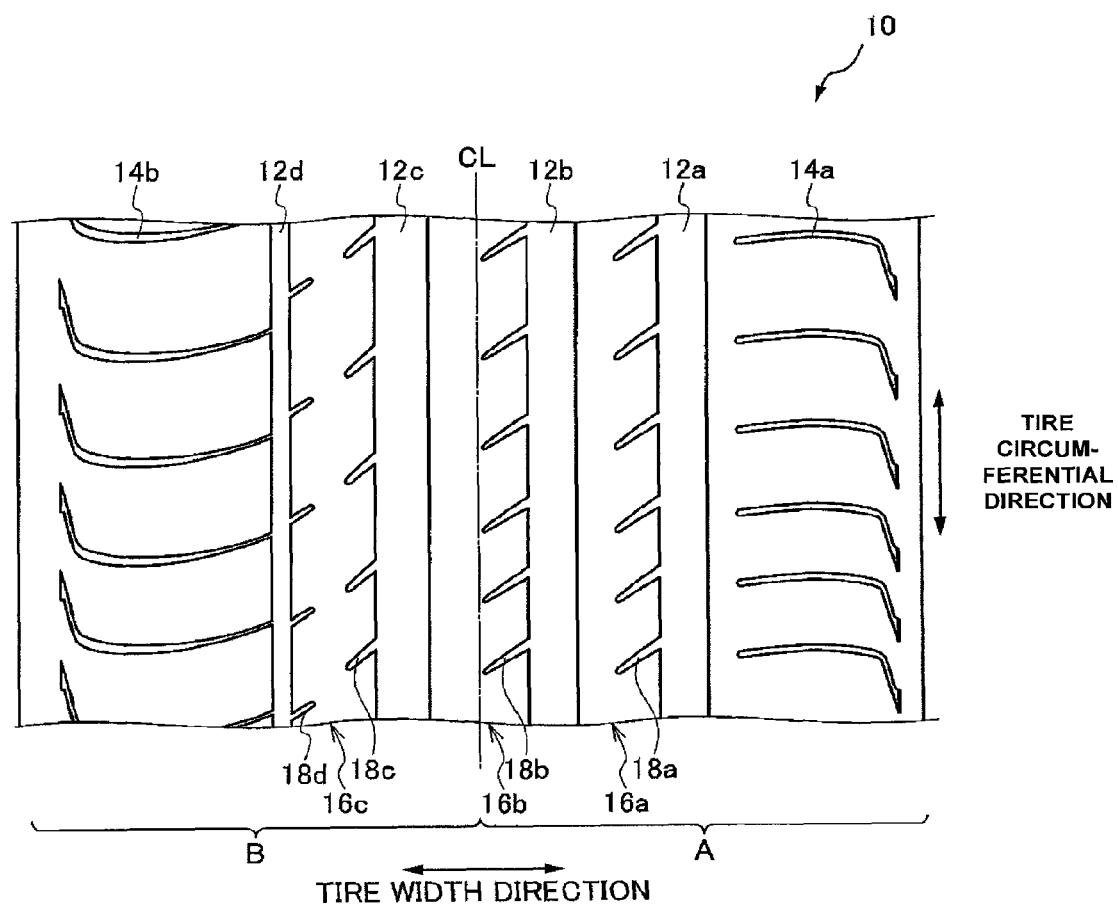
FIG. 1 is a pattern expansion plan for illustrating a tread pattern of a pneumatic tire which is an exemplary embodiment.

FIG. 1 is a pattern expansion plan for illustrating a tread pattern of a pneumatic tire (hereafter referred to as "tire") which is an exemplary embodiment.

The pneumatic tire of the embodiment is applied to a tire for a passenger vehicle. The tire for the passenger vehicle is a tire defined in Chapter A of JATMA YEAR BOOK 2008 (Japan Automobile Tire Manufacturers Association Standards). The tire can also be applied to a tire for a small truck defined in Chapter B and tires for a truck and a bus defined in Chapter C.

A tread pattern 10 illustrated in FIG. 1 mainly includes tire circumferential grooves 12a, 12b, 12c, and 12d and lug grooves 14a and 14b.

The tire circumferential grooves 12a, 12b, 12c, and 12d are circumferential rib grooves extending continuously in a tire circumferential direction. The circumferential rib grooves have groove widths of 5 to 18 mm and groove depths of 7.9 to 9.6 mm. In groove sections of these grooves, groove walls are inclined at 1 to 25 degrees so that the groove widths reduce toward groove bottoms.

The lug grooves 14a and 14b are provided at intervals in the tire circumferential direction in shoulder areas. The shoulder areas are areas outside the tire circumferential grooves 12a and 12d in a tire width direction. The lug grooves 14a are not connected to the tire circumferential groove 12a, extending in gently curved shapes in the tire width direction, and are abruptly bent outside a contact end. On the other hand, the lug grooves 14b are connected to the tire circumferential groove 12d, extending in gently curved shapes in the tire width direction from the connections, and are abruptly bent outside a contact end.

The "tire circumferential direction" refers to a rotating direction of a tread portion when the tire is rotated about a tire rotation axis. A "tire radial direction" refers to a direction orthogonal to the tire rotation axis. "Outward in the tire radial direction" refers to a direction away from the tire rotation axis. The "tire width direction" refers to a direction in which the tire rotation axis extends.

The tire circumferential grooves 12a, 12b, 12c, and 12d form land portions 16a, 16b, and 16c.

The land portions 16a and 16b are respectively provided with lug grooves 18a and 18b. The lug grooves 18a and 18b extend respectively from the tire circumferential grooves 12a and 12b, do not extend respectively through the land portions 16a and 16b, and are closed.

The land portion 16c is provided with lug grooves 18c and 18d. The lug grooves 18c and 18d extend respectively from the tire circumferential grooves 12c and 12d, do not extend through the land portion 16c, and are closed.

The lug grooves 18a, 18b, 18c, and 18d have groove depths of 6.3 to 8.0 mm and groove widths of 2.5 to 5.5 mm.

The tire circumferential groove 12b and the tire circumferential groove 12c are formed in symmetric positions about a tire center line CL and the tire circumferential groove 12b and the tire circumferential groove 12c have the same groove widths and groove depths. On the other hand, the tire circumferential groove 12d has a smaller groove width than the tire circumferential groove 12a, though the tire circumferential groove 12a and the tire circumferential groove 12d have the same groove depths. In other words, the tread pattern 10 has different groove area ratios in areas on opposite lateral sides with reference to the tire center line CL in the tire width direction and the tread pattern 10 has an asymmetric shape.

To put it concretely, the groove area ratio in the tire tread area A including the tire circumferential groove 12a on one side of the tire center line CL is larger than that in the tire tread area B having the tire circumferential groove 12d on the other side. The "groove area ratio" refers to a ratio of an area of the groove portions to a total area including an area of the land portions and the area of the groove portions on a contact area of the tread portion which is in contact with a ground. The tire tread area A has the larger groove area ratio than the tire tread area B. Therefore, when the tire is mounted to a vehicle, the tire is disposed so that the tire tread area A is positioned on a vehicle inner side and that the area B is positioned on a vehicle outer side.

When the vehicle runs in a corner, the area on the vehicle outer side of the tire contact area in contact with the ground expands as a load transfer of the vehicle occurs. Therefore, if the tire is mounted so that the tire tread area B having the smaller groove area ratio is positioned on the vehicle outer area where the contact area expands, the area of the land portions in contact of the ground can be efficiently increased and a large lateral force can be generated on the tire.

In such a tread pattern 10, the land portions 16a, 16b, and 16c are in shapes protruding outward in the tire radial direction. Edge portions of the land portions 16a, 16b, and 16c are formed by the groove walls of the tire circumferential grooves 12a, 12b, 12c, and 12d sandwiching the land portions 16a, 16b, and 16c and surfaces of the land portions in contact with the ground. The edge portions are located so as to border the tire circumferential grooves 12a, 12b, 12c, and 12d. When drop length of a point of each of the edge portions from a position of the most protruding point of each of the land portions along the tire radial direction is determined, the drop length of each of the edge portions facing to the tire tread area A is longer than the drop length of each of the edge portions facing to the tire tread area B. If the edge portion is not clear, the position of the edge portion corresponds to a point of intersection of a straight or curved line extending from the groove wall in a groove profile shape and a curved line extending from the surface of the land portion in contact with the ground.

Figure 2A:
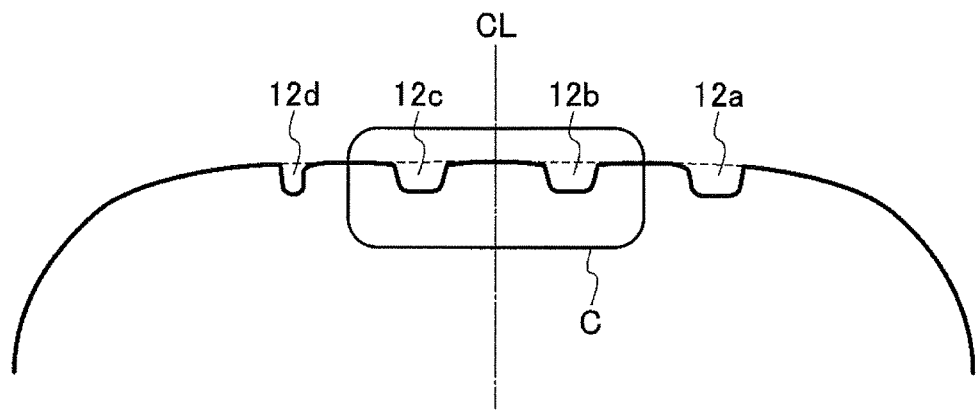
FIGS. 2A and 2B are drawings for illustrating a profile shape of the tread pattern of the tire.
Figure 2B:
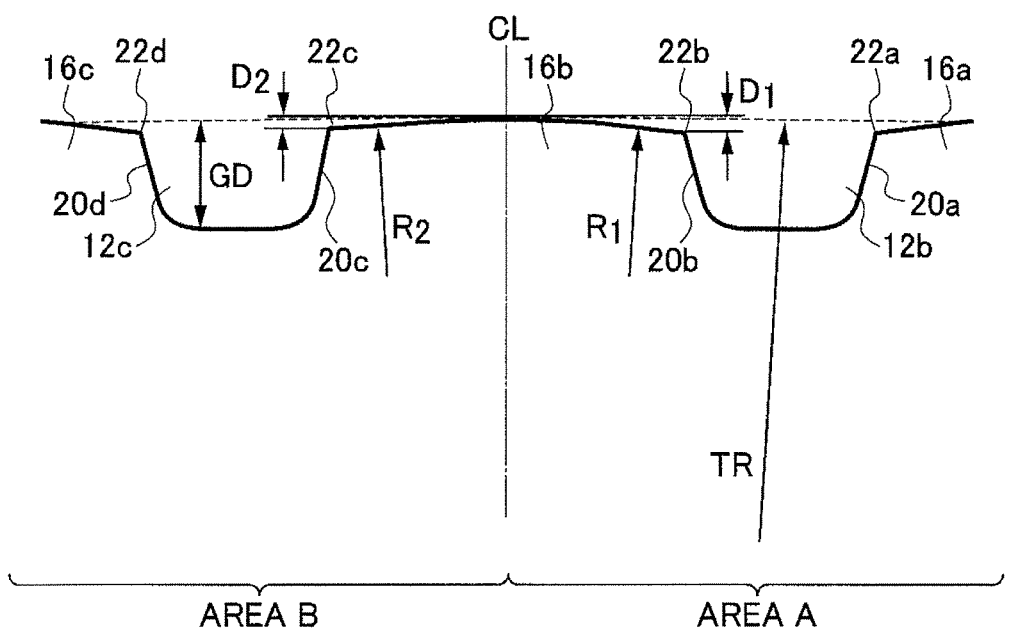

FIGS. 2A and 2B are drawings for illustrating a profile shape of the tread pattern of the tire. A portion within a frame C in FIG. 2A is illustrated in an enlarged view in FIG. 2B.

As illustrated in FIG. 2B, the land portions 16a, 16b, and 16c have the edge portions 22a, 22b, 22c, and 22d formed by the groove walls 20a, 20b, 20c, and 20d of the tire circumferential grooves 12a and 12b and the surfaces of the land portions in contact with the ground. The edge portions 22a, 22b, 22c, and 22d are located to border the tire circumferential grooves 12a and 12b. With regard to the drop lengths of the edge portions 22a, 22b, 22c, and 22d from the most protruding points of the land portions 16a, 16b, and 16c, the drop lengths of the edge portions facing to the tire tread area A are longer than the drop lengths of the edge portions facing to the tire tread area B. The most protruding points of the land portions 16a, 16b, and 16c have longest distances from the tire rotation axis to the land portions 16a, 16b, and 16c and the positions of the most protruding points of the land portions 16a, 16b, and 16c are in vicinities of central positions of the land portions 16a, 16b, and 16c in the tire width direction.

In the example illustrated in FIG. 2B, the drop length $D_1$ of the edge portion 22b of the land portion 16b and facing to the tire tread area A is longer than the drop length $D_2$ of the edge portion 22c of the land portion 16b and facing to the tire tread area B. A ratio of the drop length $D_1$ to the drop length $D_2$ is preferably higher than 1.5 and smaller than 2.

By forming the land portions 16a, 16b, and 16c in the shapes protruding outward in the tire radial direction according to the tread pattern 10 in the asymmetric shape and adjusting the drop lengths of the protruding shapes according to the asymmetric shape of the tread pattern 10, it is possible to increase handling and stability including the handling performance while maintaining the same widths of the land portions as those in the conventional tires.

The drop lengths $D_1$ of the edge portions of the land portions 16a, 16b, and 16c of the tread pattern in the embodiment are preferably 0.01 to 0.08 times and more preferably 0.02 to 0.05 times the groove depths GD (see FIG. 2B) of the tire circumferential grooves. When a smooth envelope curve (a broken line in FIG. 2B) which is a single circular arc passing through the most protruding points of the land portions 16a, 16b, and 16c and the shoulder areas is drawn, the groove depths GD of the tire circumferential grooves are defined as distances from this curve to the groove bottoms of the tire circumferential grooves. This envelope curve forms the tread profile shape.

When the land portions 16a, 16b, and 16c are divided into center areas including the most protruding points, first areas facing to the tire tread area A, (eg. positioned on sides of the tire tread area A with reference to the center areas), and second areas facing to the tire tread area B, (eg. positioned on sides of the tire tread area B with reference to the center areas), a profile shape of each of the first areas and the second areas can be defined as one arc shape. In this case, radiuses of curvature of the arc shapes of the first areas and the second areas are preferably 0.05 to 0.15 times and more preferably 0.08 to 0.12 times a radius TR of curvature (see FIG. 2B) of the tread profile shape.

The radius $R_1$ of curvature in the first area is preferably smaller than the radius $R_2$ of curvature in the second area. A ratio of the radius $R_2$ of curvature to the radius $R_1$ of curvature is preferably larger than 1.5 and smaller than 2.

Advantages of the tread patterns 10 of the embodiment were examined by using produced tires.

Tire size of 245/40R18 and rim size of 18×8.5JJ were applied to the examined tires. Tire pressure of 2.3 atmospheres was applied. A set of four tires having the same tread patterns were mounted to a 3.2-liter sedan type passenger vehicle and applied loads were adjusted so that a load on each tire was 88% a load defined in JATMA YEAR BOOK 2008 (Japan Automobile Tire Manufacturers Association Standards).

As evaluation of the tread pattern, the vehicle mounted with the tires were driven on a dry road surface and sensory evaluation of dry handling and stability including high-speed lane changing performance and handling performance was conducted by drivers (evaluation panelists). The higher index of the evaluation represents the higher evaluation. The indexes were assigned with an index of 100 representing an evaluation result of a prior-art pattern.

Figure 3A:
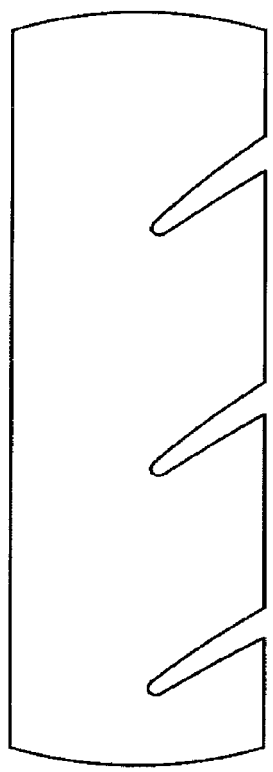
FIG. 3A is a drawing which illustrates a contact patch of a land portion of the pneumatic tire of the exemplary embodiment and FIG. 3B is a drawing which illustrates an example of a contact patch of a land portion of a conventional pneumatic tire.
Figure 3B:
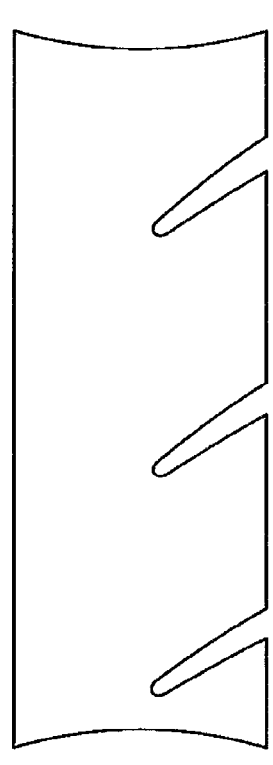

FIG. 3A illustrates a contact patch of the land portion 16b in the protruding shape in the tread pattern illustrated in FIG. 1. FIG. 3B illustrates a conventional contact patch of a portion corresponding to the land portion 16b having the tread pattern in FIG. 1 and not in the protruding shape unlike the land portion 16b. The applied rim size was 18×8.5JJ, applied tire pressure was 230 kPa, and an applied load was 5 kN.

As is obvious from comparison of FIG. 3A with FIG. 3B, a leading edge and a trailing edge of the contact patch illustrated in FIG. 3B are in recessed shapes while a leading edge and a trailing edge of the contact patch of the land portion 16b illustrated in FIG. 3A are round in protruding shapes. Results of the other land portions 16a and 16c were similar. Because of such a difference in the contact patch shape, a contact pressure distribution of the land portion in the pattern of the embodiment has been improved from a non-uniform contact distribution of conventional patterns presenting higher contact pressure in each of the opposite side areas of the land portion and lower contact pressure in an inner area.

Example

Patterns 1 to 6 and Prior-Art Pattern

As patterns 1 to 6 and a conventional pattern, the tread pattern illustrated in FIG. 1 was used. The patterns 1 to 6 were different from each other in drop lengths of edge portions. Tire circumferential grooves 12a, 12b, 12c, and 12d had groove depths GD of 8.2 mm.

In the conventional pattern, a profile of a land portion was not in a protruding shape but in a flat shape. Therefore, drop lengths of edge portions were almost zero.

The drop lengths $D_1$ of the edge portions of the patterns 1 to 3 were 0.01 times, 0.03 times, 0.08 times the groove depths GD of the tire circumferential grooves 12a, 12b, 12c, and 12d. On the other hand, the drop lengths $D_2$ of the edge portions were set to smaller values than the drop lengths $D_1$ of the edge portions and the drop lengths $D_2$ of the edge portions were 0.6 times the drop lengths $D_1$ of the edge portions.

The drop lengths $D_1$ of the edge portions in the pattern 4 were −0.03 times the groove depths GD, because the profile shapes of the land portions were recessed shapes. The drop lengths $D_1$ of the edge portions in the patterns 5 and 6 were 0.005 times and 0.01 times the groove depths GD. At this time, the drop lengths $D_2$ of the edge portions were 0.6 times the drop lengths $D_1$ of the edge portions.

Such drop lengths $D_1$ and $D_2$ were obtained from dimensions of tire shaping molds for producing the tire. These dimensions correspond to the drop lengths of the produced tire. Radiuses $R_1$ and $R_2$ of curvature described later were also obtained from the dimensions of the tire shaping molds. These dimensions also correspond to the radiuses $R_1$ and $R_2$ of curvature of the produced tire.

Ratios of the radiuses $R_1$ and $R_2$ of curvature illustrated in FIG. 2B to the radius TR of curvature of the tread profile shape was 0.1 in the patterns 1 to 6. The ratio in the conventional pattern was 1. In the patterns 1 to 3, 5, and 6, center positions of the circular arcs of the radiuses $R_1$ and $R_2$ of curvature were different from each other so as to make the drop lengths $D_1$ and $D_2$ of the edge portions different from each other and to make the radiuses $R_1$ and $R_2$ of curvature identical with each other.

Table 1 shows specifications and evaluation results of the prior-art pattern and the samples 1 to 6.

TABLE 1

|  | Conventional Pattern | Pattern 1 | Pattern 2 | Pattern 3 | Pattern 4 | Pattern 5 | Pattern 6 |
| --- | --- | --- | --- | --- | --- | --- | --- |
| Drop length $D_1$ | Almost 0 | 0.01 | 0.03 | 0.08 | −0.03 | 0.005 | 0.008 |
| $R_1, R_2$ ($R_1 = R_2$) | 1 | 0.1 | 0.1 | 0.1 | 0.1 | 0.1 | 0.1 |
| Dry Handling and stability | 100 | 102 | 104 | 106 | 98 | 101 | 101 |

As is clear from Table 1, the dry handling and stability were improved in the patterns 1 to 3, 5, and 6 in which the land portions were in the protruding shapes and the drop lengths $D_1$ of the edge portions were longer than the drop lengths $D_2$ of the edge portions. Especially, the improvement in the dry handling and stability was clear in the patterns 1 to 3. Consequently, the drop lengths $D_1$ of the edge portions are preferably 0.01 to 0.08 times the groove depths GD. A difference between the index 101 and the index 100 in the dry handling and stability is distinct enough for almost all evaluation panelists to sense and the index 102 allows the panelists to clearly feel a difference in performance.

Examples

Pattern 2, Patterns 7 to 12

As patterns 7 to 12, the tread pattern illustrated in FIG. 1 was used. In the patterns 7 to 12, the drop lengths $D_1$ and $D_2$ of the edge portions were identical with each other and the radiuses $R_1$ and $R_2$ of curvature were different from each other.

To put it concretely, the drop lengths $D_1$ of the edge portions in the patterns 7 to 12 were 0.03 times the groove depths GD of the tire circumferential grooves 12a, 12b, 12c, and 12d. On the other hand, the drop lengths $D_2$ of the edge portions were 0.018 times the groove depths GD. The ratio of the radiuses $R_1$ and $R_2$ of curvature to the radius TR of curvature of the tread profile shape was changed between 0.04 and 0.16. The radius TR of curvature of the tread profile shape is a radius obtained by approximating the tread profile shape by a single circular arc having a center located on the tire center line CL. At this time, an error between the arc and the tread profile shape is 0.5 mm or smaller.

Table 2 shows specifications and evaluation results of the patterns 2 and 7 to 12.

TABLE 2

|  | Pattern 2 | Pattern 7 | Pattern 8 | Pattern 9 | Pattern 10 | Pattern 11 | Pattern 12 |
| --- | --- | --- | --- | --- | --- | --- | --- |
| Drop length $D_1$ | 0.03 | 0.03 | 0.03 | 0.03 | 0.03 | 0.03 | 0.03 |
| $R_1, R_2$ ($R_1 = R_2$) | 0.1 | 0.04 | 0.06 | 0.08 | 0.12 | 0.14 | 0.16 |
| Dry Handling and Stability | 104 | 101 | 102 | 103 | 105 | 105 | 101 |

As is clear from Table 2, the dry handling and stability were improved in all of the patterns 2 and 7 to 12. Among them, improvements in the dry handling and stability were clear in the patterns 2 and 8 to 11. Consequently, the radiuses $R_1$ and $R_2$ of curvature (see FIG. 2B) were preferably 0.05 to 0.15 times the radius TR of curvature of the tread profile shape.

Although the pneumatic tire of the invention has been described above, the invention is not limited to the above embodiment and it is needless to say that the invention can be improved or changed in various ways without departing from the gist of the invention.

What is claimed is:

1. A pneumatic tire comprising:
a tread pattern having a plurality of land portions each sandwiched between tire circumferential grooves, the land portions including a first land portion formed on a tire center line, a second land portion formed on a vehicle outer side area of the tread pattern with reference to the tire center line, and a third land portion formed on a vehicle inner side area of the tread pattern with reference to the tire center line, each of the land portions is in a shape protruding outward in a tire radial direction and has a first edge portion bordering a first one of the tire circumferential grooves facing to a tire inner side and formed by a groove wall of the first one of the tire circumferential grooves, a second edge portion bordering a second one of the tire circumferential grooves facing to a tire outer side and formed by a groove wall of the second one of the tire circumferential grooves, and a land portion surface, and for each of the land portions a most protruding point of the land portion is positioned substantially in a central position of the land portion in a tire width direction, each drop length of each position of the first edge portion from each position of the most protruding point along the tire radial direction is longer than each drop length of each position of the second edge portion from each position of the most protruding point along the tire radial direction, and the drop length at the first edge portion being 0.01 to 0.08 times the groove depths of the tire circumferential grooves.

2. The pneumatic tire according to claim 1, wherein when the land portion is divided into a center area including the most protruding point, a first area facing to the tire inner side with reference to the center area, and a second area facing to the tire outer side, each of land portion profile shapes of the first area and the second area is determined by a single circular arc; and a radius of curvature in the first area is smaller than a radius of curvature in the second area.

3. The pneumatic tire according to claim 2, wherein a ratio of the radius of curvature in the second area to the radius of curvature in the first area is larger than 1.5 and smaller than 2.

4. The pneumatic tire according to claim wherein a groove area ratio of the tread pattern of a vehicle inner area of the tread pattern with reference to the tire center line in the tire width direction is larger than a groove area ratio of the tread pattern of a vehicle outer area of the tread pattern with reference to the tire center line in the tire width direction.

5. The pneumatic tire according to claim 4, wherein the groove area ratio is different due to a difference in widths of the tire circumferential grooves extending in the circumferential direction.

6. A pneumatic tire comprising:
a tread pattern having a plurality of land portions each sandwiched between tire circumferential grooves, the land portions including a first land portion formed on a tire center line, a second land portion formed on a vehicle outer side area of the tread pattern with reference to the tire center line, and a third land portion formed on a vehicle inner side area of the tread pattern with reference to the tire center line, each of the land portions is in a shape protruding outward in a tire radial direction and has a first edge portion bordering a first one of the tire circumferential grooves facing to a tire inner side and formed by a groove wall of the first one of the tire circumferential grooves, a second edge portion bordering a second one of the tire circumferential grooves facing to a tire outer side and formed by a groove wall of the second one of the tire circumferential grooves, and a land portion surface, and for each of the land portions a most protruding point of the land portion is positioned substantially in a central position of the land portion in a tire width direction, each drop length of each position of the first edge portion from each position of the most protruding point along the tire radial direction is longer than each drop length of each position of the second edge portion from each position of the most protruding point along the tire radial direction, and when the land portion is divided into a center area including the most protruding point, a first area facing to the tire inner side with reference to the center area, and a second area facing to the tire outer side, each of land portion profile shapes of the first area and the second area is determined by a single circular arc, and a radius of curvature in the first area is equal to a radius of curvature in the second area.

* * * * *